United States Patent [19]

Kalnin et al.

[11] 4,113,683

[45] Sep. 12, 1978

[54] PRODUCTION OF HIGH TEMPERATURE RESISTANT POLYMER COMPOSITIONS CAPABLE OF FORMING SUPERIOR FIBER REINFORCED COMPOSITE ARTICLES

[75] Inventors: Ilmar L. Kalnin, Millington; George J. Breckenridge, Clark, both of N.J.

[73] Assignee: Celanese Corporation, New York, N.Y.

[21] Appl. No.: 759,927

[22] Filed: Jan. 17, 1977

[51] Int. Cl.$^2$ ............... C08G 41/02; C08G 51/16; C08G 69/48; C08G 73/18

[52] U.S. Cl. ............... 260/857 TW; 260/29.2 N; 260/30.8 R; 260/37 R; 260/823; 260/857 R; 427/341; 428/294; 264/129

[58] Field of Search ............... 260/37 R, 78 TF, 78 S, 260/78.41, 47 CP, 49, 857 R, 823; 264/129; 427/341; 428/294

[56] References Cited

U.S. PATENT DOCUMENTS

| | | | |
|---|---|---|---|
| 3,505,277 | 4/1970 | Soehngen | 428/294 X |
| 3,987,015 | 10/1976 | Driscoll et al. | 260/78 X |

*Primary Examiner*—Michael R. Lusignan
*Attorney, Agent, or Firm*—Kenneth A. Genoni

[57] ABSTRACT

Reinforced high temperature molding compositions are provided by a two step precipitation process wherein a polymer matrix comprising either (a) a nitrogenous intractable high temperature resistant polymer such as poly(bisbenzimidazobenzophenanthroline) or (b) an admixture comprising a major amount of the nitrogenous intractable high temperature resistant polymer of (a) and a minor amount of a cross-linkable polymer such as a polybenzimidazole, is affixed to the surface of a partially plasticized organic fiber derived from polymers selected from the group consisting of (1) a nitrogenous intractable high temperature resistant polymer, (2) polybenzimidazoles (3) high temperature resistant aromatic polyamides, and (4) high temperature resistant aromatic polyesters and mixtures thereof. More specifically, the matrix polymer is initially partially precipitated onto the surface of the organic fibers from a solution such as a sulfuric acid dope and then completely precipitated by an appropriate nonsolvent medium wherein the matrix polymer is affixed to the surface of the organic fiber in the form of a fiber particle aggregate. The resulting composition is capable of providing a three dimensional article having improved flexural strength.

30 Claims, No Drawings

PRODUCTION OF HIGH TEMPERATURE RESISTANT POLYMER COMPOSITIONS CAPABLE OF FORMING SUPERIOR FIBER REINFORCED COMPOSITE ARTICLES

BACKGROUND OF THE INVENTION

In recent years considerable attention has been focused upon the development of polymers having high temperature reistance. While considerable success has been achieved in the synthesis of such polymers, it has been found that these polymers commonly are intractable and lack plastic flow characteristics normally encountered in polymers which lack high temperature resistance. Representative intractable polymers which lack a glass transition temperature below the decomposition temperature include the BBB type polymers [i.e. (poly(bisbenzimidazobenzophenanthroline) and related nitrogenous polymers]. Fibers and films routinely may be solution spun or cast from such high temperature resistant polymers. However, the intractable nature of such polymers has made the formation of quality three-dimensional shaped articles from the same difficult. For instance, when solid particles of an intractable polymer are hot pressed, good compaction commonly is achieved, but the resulting article commonly exhibits minimal particle bonding to other particles as well as to fibrous reinforcements thereby limiting its utilization to those applications where strength demands are not critical.

In an attempt to provide compositions having increased strength as well as high temperature resistance which are capable of being shaped by conventional forming methods certain cross-linkable polymers such as polybenzimidazoles (hereinafter PBI) have been admixed with a BBB type polymer base as described in U.S. Appln. Ser. No. 524,751, filed Nov. 18, 1971 issued as U.S. Pat. No. 3,987,015. However the strength of such alloyed compositions may be further enhanced in accordance with the teachings of the presently claimed invention. It has been observed that increases in strength could also be obtained by reinforcing the neat or BBB polymer which chopped BBB fibers as described in U.S. Pat. No. 3,505,277. However conventional methods for combining the resin polymer matrix and the chopped fibers do not generate adhesion between the fiber and the resin matrix and therefore the effect of the reinforcing fiber is substantially reduced.

It is an object of the present invention to improve the processability of normally intractable high temperature resistant polymers.

It is an object of the present invention to improve the processability of an intractable high temperature resistant polymer which lacks a glass transition temperature below its decomposition temperature.

It is an object of the present invention to provide an improved process for forming a three-dimensional shaped article from a normally intractable high temperature resistant polymer.

It is a further object of the present invention to improve the strength of three-dimensional articles formed from a hot pressed normally intractable high temperature resistant polymer.

It is a further object of the present invention to provide a process for reinforcing a normally intractable high temperature resistant polymer matrix or mixture of such polymer with cross-linkable polymer such as PBI with a high temperature resistant plasticized fiber in a manner sufficient to provide a strong adhesive attachment between the plasticized fiber and the polymer matrix which is deposited thereon in the form of a precipitate.

It is a further object of the present invention to provide a composition having a normally intractable high temperature resistant polymer matrix or mixture of such polymer with cross-linkable polymer such as PBI reinforced with a high temperature resistant plasticized fiber in a manner sufficient to provide a strong adhesive attachment between the plasticized fiber and the polymer matrix which is deposited thereon in the form of a precipitate.

These and other objects as well as the scope, nature, and utilization of the claimed invention will be apparent from the following description and appended claims.

SUMMARY OF THE INVENTION

In one aspect of the present invention there is provided a process for providing a high temperature resistant composition from a normally intractable high temperature resistant polymer, which composition is capable of being formed into a shaped article which comprises:

I. providing a solution of a substance selected from the group consisting of:
  (a) a nitrogenous intractable high temperature resistant polymer which lacks a glass transition temperature above 200° C and below its decomposition temperature, or precursors capable of forming the same; and
  (b) an admixture comprising a major amount of the intractable polymer of (a) and a minor amount of cross-linkable polymer exhibiting a glass transition temperature above 200° C and below its decomposition temperature, or precursors capable of forming the same;

II. providing a suspension of partially plasticized organic fibers derived from polymers selected from the group consisting of:
  (a) the nitrogenous intractable polymer of step I(a),
  (b) polybenzimidazoles,
  (c) high temperature resistant aromatic polyamides,
  (d) high temperature resistant aromatic polyesters, and mixtures thereof;

III. combining the suspension of II and the solution of I in a manner sufficient to provide a partial precipitation of a portion of the dissolved substance of I affixed to the suspended organic fibers of II thereby forming a mixture containing a fiber particle aggregate;

IV. combining the mixture of III with a non-solvent in a manner sufficient, and with properties sufficient to precipitate, affix and incorporate the remaining portion of the dissolved substance of I from the mixture of III into the fiber particle aggregate to form a fiber-particle aggregate composition having substantially all of the dissolved substance of I affixed to and intimately admixed with said organic fibers of II; and V. filtering and washing the composition to remove residual solvent.

In another aspect of the present invention there is provided a reinforced high temperature resistant composition capable of forming a three-dimensional shaped article having a mean flexural strength of at least 5000 p.s.i. at room temperature which composition is prepared by a process which comprises I. providing a solution of a substance selected from the group consisting of:

(a) nitrogenous intractable high temperature resistant polymer which lacks a glass transition temperature above 200° C and below its decomposition temperature, or precursors capable of forming the same; and (b) an admixture comprising a major amount of the intractable polymer of (a) and a minor amount of cross-linkable polymer exhibiting a glass transition temperature above 200° C and below its decomposition temperature, or precursors capable of forming the same;

II. providing a suspension of partially plasticized organic fibers derived from polymers selected from the group consisting of:

(a) the intractable polymer of step I(a),
(b) polybenzimidazoles,
(c) high temperature resistant aromatic polyamides,
(d) high temperature resistant aromatic polyesters, and mixtures thereof;

III. combining the suspension of II and the solution of I in a manner sufficient to provide a precipitation of a major portion of the dissolved substance of I affixed to the suspended organic fibers of II thereby forming a mixture containing a fiber-particle aggregate;

IV. combining the mixture of III with a non-solvent in a manner sufficient, and with properties sufficient to precipitate, affix, and incorporate the remaining portion of the dissolved substance of I from the mixture of III into the fiber-particle aggregate to form a fiber-particle aggregate composition having substantially all of the substance of I affixed to and intimately admixed with said organic fibers of II; and V. filtering and washing the composition to remove residual solvent.

DESCRIPTION OF PREFERRED EMBODIMENT

The present invention relates to a process for providing a high temperature resistant composition from a normally intractable high temperature resistant polymer and a plasticized organic fiber which composition is capable of being formed into a three-dimensional shaped article having improved flexural strength.

The Intractable High Temperature Polymer of Step I(a)

The present process is suitable for use with those high temperature polymers which are considered to be intractable and which lack plastic flow characteristics exhibited by thermoplastic polymers and partially cured thermosetting polymers. The intractable high temperature polymers commonly exhibit a thermal decomposition point of at least 450° C (preferably at least 550°) in an inert atmosphere (e.g., nitrogen), and lack a glass transition temperature (Tg) below the thermal decomposition temperature. As is recognized by those skilled in polymer technology, a glass transition temperature is the temperature at which the structure of a wholly or partially amorphous polymeric material changes from a vitreous state to a visco-plastic state. The glass transition temperature of a given polymer sample conveniently may be determined utilizing conventional thermoanalytical techniques. For instance, when a shaped polymer test specimen is subjected to continuous measurement of its thermal expansion (or contraction) by progressively increasing (or decreasing) the temperature, it commonly is seen that a significant increase (or decrease) in the specimen length takes place suddenly at a given temperature, i.e., at the so-called glass transition temperature or point. This measurement is commonly termed thermomechanical analysis and may be carried out with commercially available instruments. For instance, a Thermomechanical Analyzer, Model No. 990, manufactured by DuPont, was used for the glass transition temperature measurements referred to in the present application.

On the other hand, when an intractable polymer is subjected to such thermomechanical analysis, the thermal expansivity of the test specimen may increase (or decrease) monotonically with changing specimen temperature, but no sudden change in thermal expansivity will be seen.

Likewise, a sudden change in the elastic compliance with temperature can be used to identify the presence of a glass transition temperature, since above that temperature the compliance will be substantially higher than below. When an intractable polymer is tested, the compliance will increase strictly monotonically and to a much lesser extent with increasing temperature than when a tractable specimen is tested.

Representative intractable polymers for use in the process include the polymers of the BBB type [i.e., polybisbenzimidazobenzophenantholine and related nitrogenous polymers]. Such BBB type polymers may be of either of the semi-ladder (i.e., have a combination of cyclic and non-cyclic C—C single bonds in the polymer chain) or ladder (i.e., have an entirely cyclic structure with no C—C single bond as the sole link in the polymer chain) variety. The ladder polymer variety sometimes is identified as a BBL polymer. Other intractable ladder polymers, such as the polypyrrolones, which contain anthraquinone units may be employed. See, for instance, the discussion of such polymers by P. K. Dutt and C. S. Marvel in "Polymers Containing Anthraquinone and Quinoxaline Units: Polypyrrolones", J. Polymer Science, Pt. A-1, vol. 8, No. 11, pp. 3225 (1971).

HIGH TEMPERATURE POLYMER STRUCTURE

As is now otherwise known in the art, BBB type polymers may be formed by condensing at least one organic tetra-amine with at least one tetracarboxylic acid (which also may be in the form of the corresponding half anhydride or dianhydride).

The organic tetra-amine reactant may have the structural formula

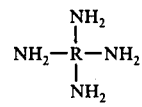

wherein R is an aromatic or cycloaliphatic tetravalent radical and wherein each of the four amino groups are attached directly to a carbon atom present in a ring of said aromatic or cycloaliphatic radical in a position which is ortho or peri to another carbon atom to which another of said amino groups is also directly attached. When R is an amino substituted bicyclic ring compound, such as tetra-amino substituted naphthalene, the carbon atoms at the 1 and 8 positions are considered to be peri to each other as are the carbon atoms at the 4 and 5 positions. Five or six member rings are formed depending upon whether R is ortho or peri amino substituted respectively, as will be apparent to those skilled in the art. It is preferred that R be an aromatic radical rather than a cycloaliphatic radical. It is preferred that R contain up to about 20 carbon atoms.

Non-limiting examples of the tetara-amine monomers which may be used individually or in mutual admixture when forming the BBB type polymers are: 3,3'-diaminobenzidine; bis(3,4-diamino phenyl) methane; 1,2-bis(3,4-diamino phenyl) ethane; 2,2-bis(3,4-diamino phenyl) propane; bis (3,3-diamino phenyl)ether; bis(3,4-diamino phenyl) sulfide; bis(3,4-diamino phenyl) sulfone; 1,2,4,5-tetra-amino benzene, 1,4,5,8-tetra-aminonaphthalene; 2,3,6,7-tetra-aminonaphthalene; etc. and the corresponding ring hydrogenated tetra-amines.

The tetracarboxylic acid reactant (which also may be in the form of the corresponding half anhydride or dianhydride) may have the structural formula

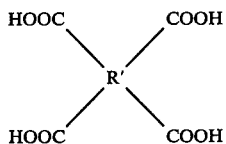

wherein R' is a tetravalent aromatic or cycloaliphatic radical wherein each of the four carboxyl groups is attached directly to a carbon atom present in a ring of said aromatic or cycloaliphatic radical in a position which is ortho or peri to another carbon atom to which another of said carboxyl group is also directly attached. When R' is a carboxyl substituted bicyclic fused ring compound such as tetra-carboxyl naphthalene, the carbon atoms at the 1 and 8 positions are considered to be peri to each other, as are the carbon atoms at the 4 and 5 positions. Five or six member rings are formed depending upon whether R' is ortho or peri carboxyl substituted respectively, as will be apparent to those skilled in the art. It is preferred that R' be an aromatic radical rather than a cycloaliphatic radical. It is preferred that R' contain up to about 20 carbon atoms.

Non-limiting examples of the tetracarboxylic acids which may be used in forming the BBB type polymers include: pyromellitic acid, i.e., 1,2,4,5-benzenetetracarboxylic acid; 2,3,6,7-naphthalene tetracarboxylic acid; 3,3',4,4'-diphenyl tetracarboxylic acid; 1,4,5,8-naphthalene tetracarboxylic acid; 2,2',3,3'-diphenyl tetracarboxylic acid; 2,2-bis(3,4-dicaboxyphenyl) propane; bis (3,4-dicarboxyphenyl) sulfone; 3,4,9,10-perylene tetracarboxylic acid; bis(3,4-dicarboxyphenyl)ether; ethylene tetracarboxylic acid; naphthalene-1,2,4,5-tetracarboxylic acid; decahydronaphthalene-1,4,5,8-tetracarboxylic acid, 4,8-dimethyl-1,2,3,5,6-hexahydronaphthalene-1,2,5,6-tetracarboxylic acid; 2,6-dichloronaphthalene-1,4,5,8-tetracarboxylic acid; 2,7-dichloronaphthalene-1,4,5,8-tetracarboxylic acid; 2,3,6,7-tetrachloronaphthalene-1,4,5,8-tetracarboxylic acid; phenanthrene-1,8,9,10-tetracarboxylic acid; cyclopentane-1,2,3,4-tetracarboxylic acid; pyrrolidine-2,3,4,5-tetracarboxylic acid; pyrazine-2,3,5,6-tetracarboxylic acid; 2,2-bis(2,3-dicarboxyphenyl)propane; 1,1-bis(3,4-dicarboxyphenyl) ethane; bis(2,3-dicarboxyphenyl) methane; bis(3,4-dicarboxyphenyl)methane; benzene-1,2,3,4-tetracarboxylic acid; 1,2,3,4-butane tetracarboxylic acid; thiophene-2,3,4,5,-tetracarboxylic acid; and similar acids, as well as the half anhydrides (i.e., mono anhydride) or dianhydrides of such acids. The preferred tetracarboxylic acids contain carboxyl groups peri substituted upon a naphthalene nucleus.

The intractable BBB type polymers may be formed in accordance with known techniques, and commonly exhibit an inherent viscosity of at least 0.5 dl./gram (e.g., 0.8 to 4.0 dl./gram). The inherent viscosity may be measured at 25° C at a concentration of 0.4 g. of polymer per 100 ml. of solvent. Ninety-seven percent sulfuric acid (by weight) is a convenient and preferred solvent for the purpose of this invention though other solvents may be used similarly. The viscosity of the polymer solution is measured relative to that of the solvent alone and the inherent viscosity (I.V.) is determined from the following equation:

$$I.V. = \frac{\ln \frac{V_2}{V_1}}{C}$$

In the above formula, $V_2$ is the efflux time of the solution, $V_1$ is the efflux time of the solvent, and $C$ is the concentration expressed in grams of polymer per 100 ml. of solution. As is known in the polymer art, inherent viscosity is monotonically related to the molecular weight of the polymer. Representative techniques for forming the BBB type polymers are disclosed in commonly assigned U.S. Pat. Nos. 3,539,677; 3,574,170; 3,574,171; 3,792,024; and 3,798,201; and U.S. Ser. Nos. 221,780, filed Jan. 28, 1972, now abandoned; and Ser. No. 424,996, filed Dec. 14, 1973 issued as U.S. Pat. No. 3,969,325, which are herein incorporated by reference.

The Cross-Linkable Additive Polymer of Step 1(b)

The cross-linkable additive polymer which optionally may be selected for use in step I of the present process unlike the intractable high temperature polymer exhibits a recognizable glass transition temperature below its decomposition temperature. More specifically, which the solid additive polymer is subjected to thermomechanical analysis, a sharp increase of both the thermal expansion and the elastic shear compliance takes place at the glass transition temperature, Tg, upon heat-up of the test specimen. Such glass transition temperature preferably should occur at temperatures above 200° C and most preferably at a temperature above 250° C. The additive polymer is cross-linkable in the sense that upon exposure to heat (e.g. at approximately the glass transition temperature) its polymeric chains start forming primary bonds to their neighboring chains (i.e. cross-linking occurs). When cross-linking occurs the stiffness of the bonded chain assembly increases, and chain mobility decreases greatly, thereby causing a gradual disappearance of the original Tg. Particularly effective cross-linking atoms are oxygen and nitrogen both of which tend to act as "bridge" atoms to effect the cross-linking provided the temperature is high enough to initiate the same by increasing chain mobility to the point at which the reactive sites begin to interact.

Representative cross-linkable additive polymers for use in the process include the polybenzimidazoles, polyquinoxalines, polybenzothiazoles polybenzoxazoles, polyoxadiazoles, and mixtures thereof. Homopolymers or copolymers of such cross-linkable additive polymers may be selected. Alternatively, precursors capable of forming the same during subsequent processing initially may be selected and admixed.

The cross-linkable additive polymer may be formed by techniques known in the art. For instance, polybenzimidazoles may be preformed in accordance with the teachings of U.S. Pat. Nos. 2,895,948; 3,174,947;

3,433,772; 3,509,108 and 3,549,603 which are herein incorporated by reference.

The polybenzimidazoles commonly include recurring units of the formula:

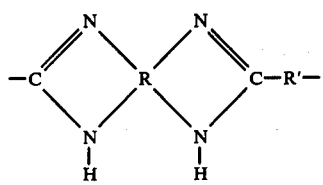

wherein R is a symmetrically tetravalent aromatic nucleus, the adjacent carbon atoms of which pair with nitrogen atoms, to form the benzimidazole rings, and R' is an aromatic or alicyclic ring, an alkylene group or a heterocyclic ring. Examples of such heterocyclic rings include those of pyridine, pyrazine, furan, quinoline, thiophene and pyran. Preferred R groups are diphenyl with free valences at the 3,3',4, and 4' positions, i.e.,

benzene with free valences at the 1,2,4, and 5 positions, i.e.,

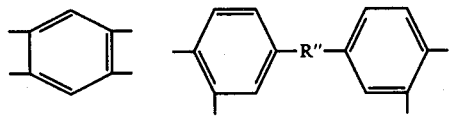

wherein R'' is

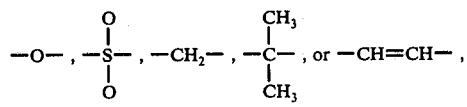

Examples of such polybenzimidazoles include poly-2,2' (m-phenylene) 5,5'-bibenzimidazole; poly-2,2'-(pyridylene-3'', 5'')-5,5'-bibenzimidazole; poly-2,2,'-(furylene-2'', 5'')-5,5'-bibenzimidazole; poly-2,2'-(naphthalene-1Δ,6'')-5,5'-bibenzimidazole; poly-2,2'-(biphenylene-4'',4'')-5,5'-bibenzimidazole; poly-2,2'-octamethylene-5,5'-bibenzimidazole; poly-2,6-(m-phenylene)-diimidazobenzene; poly-2,2'-cyclohexenyl-5,5'-bibenzimidazole; poly-2,2'-(m-phenylene)-5,5'-di(-benzimidazole) ether; poly-2,2'-(m-phenylene)-5,5'-di(-benzimidazole)sulfide; poly-2,2'(m-phenylene-5,5'-di(-benzimidazole)sulfone; poly-2,2'(m-phenylene-5,5'-di(-benzimidazole) methane; poly-2',2''(m-phenylene)-5,5''di(benzimidazole) propane-2,2, and poly-2',2''-(m-phenylene)-5',5''di(benzimidazole) ethylene-1,2 where the double bonds of the ethylene groups are intact in the final polymer. The particularly preferred polybenzimidazole for use in the process is poly-2,2'(m-phenylene)5,5'-bibenzimidazole. Preformed polybenzimidazoles preferably have an inherent viscosity of at least 0.5 dl./gram, and most preferably about 0.6 to 1.0 dl./gram.

Preparation of Cross-Linkable Polymers

As discussed in U.S. Pat. No. 3,174,947 polybenzimidazoles may be prepared by reacting a member of the class consisting of (A) an aromatic compound containing ortho disposed diamino substitutents and an aromatic carboxylate ester substituent and (B) a mixture of (1) an aromatic compound containing a pair of ortho-diamino substituents on the aromatic nucleus and (2) a member of the class consisting of (a) the diphenyl ester of an aromatic dicarboxylic acid and, (b) the diphenyl ester of a heterocyclic dicarboxylic acid wherein the carboxyl groups are substituents upon carbon in a ring compound from the class consisting of pyridine, pyrazine, furan and quinoline and (c) an anhydride of an aromatic dicarboxylic acid. The "aromatic compound" mentioned in the foregoing description of (A) and (B) may contain a single aromatic ring structure or a plurlity of such ring structures, e.g., two such structures separated by an ether, sulfide, sulfone, alkylidene or alylene group to yield the foregoing polymer structures.

The polyquinoxalines may be prepared from bis-o-diamines and bisglyoxalyls in accordance with techniques reported by G. P. deGaudemaris and B. J. Sillion in "New Polymers Obtained by Polyheterocyclization: Polyquinoxalines", J. Polymer Sci., part B. vol. 2, pp. 203–207, and J. K. Stille and J. R. Williamson, "Polyquinoxalines", J. Polymer Sci., part B, vol. 2, p. 209.

The polybenzothiazoles may be prepared from 3,3'-dimercaptobenzidine and the diacid, diphenyl ester, diacid chloride, etc. (e.g., diphenyl isophthalate). See "Polybenzothiazoles, I: Synthesis and Preliminary Stability Evaluation", by P. M. Hergenrother, W. Wrasidlo, and H. H. Levine, J. Polymer Sci., part A, vol. 3, pp. 1665–1674 (1965).

The polybenzoxazoles are similar to the polybenzothiazoles except that the sulfur atoms of the later molecules are replaced by oxygen molecules. The preparation of the polybenzoxazoles is therefore analogous to that of the polybenzothiazoles. The polybenzoxazoles may be prepared by the reaction of 4,4'-dihydroxy-m-benzidine, and an aromatic diacid, its ester, or the diacid chloride (e.g., isophthaloyl chloride).

The polyoxadiazoles may be prepared by heating polyhydrazides or by the reaction of a bistetrazole (e.g., p-phenylene-5,5'-tetrazole) and an aromatic diacid chloride (e.g., isophthaloyl chloride) as described for instance by C. J. Abshire and C. S. Marvel in "Some Oxadiazole Triazole Polymers", Macromol. Chem., Vol. 44–46, pp. 388–397 (1961).

The fibers which may be utilized to reinforce the polymer matrix can be any high temperature resistant fiber possessing the requiements hereinafter described. A high temperature resistant fiber is one which is capable of withstanding temperatures in excess of 200° C for an indefinite period of time and temperatures in excess of 300° C for limited periods which may vary from about 0.5 to about 2000 hours, preferably from about 100 to about 2,000 hours, and most preferably from about 500 to about 2,000 hours.

Such high temperature resistant fibers may be prepared from polymers such for example as the normally intractable polymers and polybenzimidazole polymers described above. Additional polymers which may be utilized to prepare these fibers include high temperature resistant fiber forming aromatic polyamides, and high temperature resistant fiber forming aromatic polyesters.

The term "aromatic polyamides" as used herein refers to a polymer wherein repeating units are linked by an amide group, i.e., the

radical wherein R is hydrogen or lower alkyl; the nitrogen and carbon atom of each repeating amide radical being directly attached to a carbon atom in the ring of an aromatic radical, that is, the nitrogen and carbon atom of each repeating amide group each replaces a hydrogen of an aromatic ring. The term "aromatic ring" means a carbocyclic ring possessing resonance.

The aromatic polyamides which may be utilized to provide the fiber reinforcement in the practice of the invention may be prepared by reacting an aromatic diacid chloride with an aromatic diamine, the acid groups of the diacid chloride and the amine groups of the diamine being oriented ortho-, meta- or para-related to each other (with meta-orientation being preferred), at a low temperature, e.g., a temperature below 100° C. Aromatic amino-acyl compounds also may be used in preparing suitable polymers. In addition, other polymer-forming ingredients, preferably up to about 10 mole percent, which need not contain an aromatic nucleus can be included without materially detracting from the desired physical and chemical properties of the polymers used to prepare the fibers of this invention. Substituents attached to any aromatic nucleus may be one or more or a mixture of lower alkyl, lower alkoxy, halogen, nitro, lower carbalkoxy, or other groups which do not form a polyamide during polymerization. Preferably, however, the diamine and diacid compounds utilized will be wholly aromatic, thus resulting in a polymer wherein the repeating units linked by an amide group are divalent aromatic radicals. Suitable diamines for preparation of the aromatic polyamides used in the invention include m-phenylenediamine, lower alkyl substituted m-phenylenediamines such as 4-methyl-m-phenylenediamine, alkoxy substituted m-phenylenediamines such as 4-methoxy-m-phenylenediamine, halogen-substituted m-phenylene-diamines such as 4-chloro-m-phenylenediamine, p-phenylenediamine and substituted derivatives thereof. 4,4'-diphenyldiamine, 3,3'-diphenyldiamine, and 4,4'-sulfonyldiphenyldiamine.

Suitable diacid chlorides for preparation of the aromatic polyamides used in the invention include isophthaloyl chloride and lower alkyl isophthaloyl chlorides such as 4-methyl-isophthaloyl chloride, halogen-substituted isophthaloyl chlorides such as 4-chloro-isophthaloyl chloride, terephthaloyl chloride and substituted derivatives thereof, 3,3'-dibenzoyl chloride, and 4,4'-dibenzoyl chloride. Additional diamines and diacid chlorides suitable for preparing the aromatic polyamides used in the invention are disclosed in U.S. Pat. No. 3,036,966 and U.S. Pat. No. 3,094,511, which also disclose detailed procedures for preparing these aromatic polyamides.

Preferably the polyamide will be wholly aromatic. Because of its valuable properties and ease of preparation, poly (m-phenylene isophthalamide) is a preferred polyamide. Another preferred polyamide is poly(p-phenylene terephthalamide), which has exceptionally high thermal stability.

The high temperature aromatic polyesters which may be utilized to provide the fiber reinforcement in the practice of the present invention are well known to one skilled in the art as being the condensation product of various aromatic dicarboxylic acids and aromatic diols and are characterized as generally having high glass transition temperatures and high heat distortion temperatures.

Representative publications which discuss wholly aromatic polyesters include: (a) *Polyesters of Hydroxybenzoic Acids,* by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols),* by G. Bier, Polymer, Vol. 15, Pages 527 to 535 (August 1974), (c) *Aromatic Polyester Plastics,* By S. G. Cottis, Modern Plastics, Pages 62 to 63 (July 1975), and (d) *Poly(p-Oxybenzoyl Systems): Homopolymer for Coatings: Copolymers for Compression and Injection Molding,* by Roger S. Storm and Steve G. Cottis, Coatings Plast. Preprint, Vol. 34, No. 1, Pages 194 to 197 (April, 1974). See also, U.S. Pat. Nos. 3,039,994; 3,169,121; 3,321,437; 3,553,167; 3,637,595; 3,651,014; 3,723,388; 3,759,870; 3,767,621; 3,787,370; 3,790,528; 3,829,406; and 3,890,256, as well as U.S. patent application Ser. No. 686,191, filed May 13, 1976, and U.S. patent application Ser. No. 686,189, filed May 13, 1976, which are herein incorporated by reference.

The aromatic acids which may be utilized to provide aromatic polyesters typically are dicarboxylic acids in which each carboxy group is attached to a carbon atom in an isolated or fused benzene ring.

Representative examples of aromatic acids include terephthalic acid, isophthalic acid, diphenyl-4,4'-dicarboxylic acid, naphthalene-2,6-dicarboxylic acid, naphthalene-2,7-dicarboxylic acid, naphthalene-1,4-dicarboxylic acid, naphthalene-1,5-dicarboxylic acid, diphenylether,4,4'-dicarboxylic acid, diphenylsulfone-4,4'-dicarboxylic acid, diphenylmethane-4,4'-dicarboxylic acid and diphenoxyethane-4,4'-dicarboxylic acid, as well as the ester forming derivatives thereof.

The aromatic diols which may be utilized to provide the aromatic polyesters typically are diols in which said hydroxy group is attached to a carbon atom in an isolated or fused benzene ring.

Representative examples of suitable aromatic diols include hydroquinone, resorcinol, 1,4-naphthalenediol, catechol, 4,4'-isopropylidenediphenol (also known as bisphenol A), 4,4'-sulfonyldiphenol, 4,4'-thiodiphenol, 4,4'-oxydiphenol, 4,4'-dihydroxybiphenyl, 4,4'-sulfonylbis(2,6-dibromophenol), 4,4'-(2-norbornylidene)diphenol, 2,6-naphthalene-diol, 4,4'-isopropylidenebis (2,6-dichlorophenol).

Such aromatic polyesters may also have incorporated therein aromatic hydroxy acids such as p-hydroxybenzoic acid, m-hydroxybenzoic acid and the various naphthalenehydroxy-carboxylic acids.

It is to be observed that the selection of a suitable specific aromatic polyamide or polyester polymer to provide the fibers which may be utilized as the reinforcing agent of the present invention may be made by one skilled in the art based on the requirement that such polymer must be (1) high temperature resistant as herein defined and (2) capable of being provided in the configuration of a fiber which fiber is sufficiently strong to serve as an effective reinforcement of the composite article eventually produced. Accordingly, suitable polymers should be capable of providing a fiber having a strength of at least 3 grams per denier (c.a. 50,000 psi) and preferably greater.

In the practice of the present invention the polymer solution of step I(a) may be prepared by dissolving the nitrogenous intractable high temperature resistant polymer in a solvent for the same. The nature of the solvent and the concentration of the polymer therein may be varied so long as the polymer undergoes no substantial irreversible chemical reaction or degradation while dissolved therein. The concentration of the polymer in the solution is limited only by the solubility of polymer in the solvent. Thus the concentration of the polymer in the solution may vary from about .1 to about 5 (e.g., .2 to 0.8) percent by weight based upon the total weight of the solution.

Solvents capable of dissolving the polymers of step I(a) include sulfuric acid, methane sulfonic acid, polyphosphoric acid, chlorosulfonic acid, trifluoromethane sulfonic acid, antimony trichloride, and benzenesulfonic acid.

A preferred solvent is concentrated $H_2SO_4$. It has been observed that the polymer dissolves most readily on warming to a temperature of between 50° to 70° C to produce a viscous solution. The sulfuric acid concentration of the solvent preferably has an equivalent $H_2SO_4$ content of about 94 to 102% by volume.

The solution of the admixture of step I(b) is provided by dissolving a major amount of the normally intractable high temperature resistant polymer and a minor amount of the cross-linkable additive polymer (or precursors capable of forming the same).

Both components of the admixture may be dissolved in a common solvent or alternatively a solution containing each component dissolved therein may be blended together. The total concentration of the admixture in the solution is limited only by the solubility of each component in the selected solvent.

The admixture itself may comprise from about 60 to 95 parts by weight, preferably from about 75 to about 92 parts by weight, most preferably from about 80 to about 90 parts by weight of the intractable high temperature resistant polymer and correspondingly about 5 to about 40 parts by weight, preferably from about 8 to about 25 parts by weight and most preferably from about 10 to about 20 parts by weight of the cross-linkable polymer.

Suitable solvents for the admixture include concentrated sulfuric acid as described above, methane sulfonic acid, benzene sulfonic acid, polyphosphoric acid, formic acid, dimethylacetamide, hexamethylphosphoramide, antimony trichloride, tetramethylurea and mixtures thereof. It is appropriate to mention that antimony trichloride melts at 73° C and consequently must be utilized above this temperature. The remaining solvents may be utilized at room or elevated temperatures such as 35° to 75° C. Although the use of a heated solvent will generally tend to increase the solubility of the polymer, this advantage may be offset by the need to utilize safety measures and devices to accommodate the disposal of toxic solvent vapors which evolve at an increased rate as a result of the elevated temperatures.

The suspension of partially plasticized organic fibers is provided by preparing one or more of the polymers herein described and subjected them to process conditions well known in the art sufficient to transform the polymer into a fiber. The word "fiber" is meant to include any filamentary configuration such as sliver, yarn, tow, roving, fibrids, filament and may consist of staple or continuous fibers. If desired, the fibers may be introduced into the swelling medium in the form of a woven or knitted fabric, ribbon, or entangled tow with the preferred configuration being loose untwisted staple fiber.

Typically chopped fibers having an average length which may vary from not less than 0.04 inch to about 2 inches (e.g. 0.25 to 2.0 inches), preferably from about 0.1 to about 1 inch, most preferably from about .1 to about 1 inch and a filament denier which may vary from about 0.5 to 20 denier per filament (ie. dpf) preferably from about 0.8 to about 8dpf, most preferably from about 1 to about 3dpf are utilized to provide the suspension of step II.

The suspension of step II can be partially plasticized by the addition of a suitable plasticizing agent. Preferably such plasticizing agent is also the medium in which the organic fibers are suspended.

The word "plasticization" is herein defined to refer to the equilibrium phenomena of a chemical agent which is established upon contact with a fiber which results in increased flexibility and softening thereof by alteration of the intermolecular forces between the polymer chains present therein.

The molecules of certain chemical agents (i.e. plasticizers) are capable of penatrating into the polymers of a fiber and thereby displacing the polymer chains from their original position. Such displacement is evidenced by a dilation or "swelling" of the original polymer and is accompanied by a weakening of the intermolecular forces between the polymer chains which in turn gives rise to said enhanced softness and flexibility. The plasticizing effect can be reversed by removing the plasticizer from the fiber, either by chemical means or by diffusion due to a concentration gradient after which the polymeric material usually regains its original internal structure, shape and volume.

A significant aspect of plasticization is that it is an equilibrium phenomena as opposed to dissolution which is a kinetic phenomena. Certain plasticizing agents (e.g. $H_2SO_4$) if present at a sufficiently high concentration, will not achieve an equilibrium state of plasticization (i.e., with respect to the degree of dilation) but will immediately begin to dissolve the polymer. Consequently, the concentration of the plasticizing agent is tailored to achieve a state of equilibrium which is inherently associated with plasticization of a fiber as herein defined. Such concentrations will vary depending on the plasticizing agents utilized and the type of fiber to be plasticized. Certain organic fibers such as those derived from polymers such as poly (bisbenzimidazobenzophenanthroline) will require higher concentrations of plasticizing agents than polybenzimidazole derived fibers.

If the $H_2SO_4$ concentration utilized is too high, e.g. 97%, the fiber will begin to dissolve. If the $H_2SO_4$ concentration is too low (e.g. about 50%), the fibers will not be plasticized to the extent required to achieve nucleation of the precipitate at the fiber surface as hereinafter described.

Accordingly, a solvent such as concentrated sulfuric acid, as disclosed above is diluted with water to an extent sufficient to provide a $H_2SO_4:H_2O$ ratio capable of swelling and partially plasticizing the organic fibers but incapable of dissolving the same. Typical $H_2SO_4:H_2O$ ratios by volume may vary, for example from about 75:25 (e.g. 70:30) to about 60:40.

Other suitable plasticizing agents for the BBB type polymer may include methane sulfonic acid, benzene sulfonic acid, polyphosphoric acid, formic acid, dimethylacetamide, and dimethylformamide for the PBI type fiber; dimethylacetamidelithium chloride, hexamethylphosphoramide, and tetramethylurea for the amide types of fibers.

A "partially plasticized" fiber as used herein refers to a fiber wherein a chemical agent (i.e. plasticizer) penetrates the filaments of said fiber to a limited extent, i.e. only into the outer surface portion, and just far enough to achieve a dilation of not greater than 20% and preferably from about 10 to about 20% of the original fiber diameter.

The degree of plasticization (i.e. partial) is primarily controlled by the period of time during which the fibers are contacted by, e.g. suspended in, the plasticizing agent.

Thus, in order to obtain a "partially plasticized" fiber it is necessary to contact the organic fibers of step II with a plasticizing agent for a suitable period of time.

Thus, the organic fibers are allowed to remain suspended in the plasticizing medium for a period of not less than 5 minutes and preferably from about 10 to about 15 minutes in order to achieve the required degree of plasticity necessary to obtain a "partially plasticized" fiber as herein defined.

Where the period of contact between the fiber and the plasticizing agent is less than 5 minutes the fiber is not swollen to the extent sufficient to provide an adequate number of nucleation sites at the fiber surface as hereinafter described. If the swelling of the fibers proceeds beyond the point of "partial plasticization" and approaches the equilibrium associated with "plasticization" the swelling can be reversed as described above.

The solution of step I is then added to the suspension of the partially plasticized organic fibers of step II in a manner sufficient to provide a gradual partial precipitation of a major portion of the dissolved substance of step I and its adhesion to the surface of suspended organic fibers to form a mixture containing solvent and a cohesive fiber-particle aggregate. Such partial precipitation is achieved by slowly adding said solution to the diluted $H_2SO_4$ suspension of swollen organic fibers while stirring at a low rate of agitation.

A "slow" rate of addition is herein defined to characterize a rate of addition which is sufficient to allow the polymeric powder to precipitate at the surface of the suspended fibers.

The precipitation of any dissolved material initiated by contact with a non-solvent consists of two often overlapping but clearly distinct steps, namely (1) nucleation, i.e., generation of a nuclei which acts as a center for particle growth and (2) growth of the solid suspended particles by a rapid addition of mass to the nuclei. The formation of a nuclei requires a certain energy of activation and the higher the nucleation energy of activation the fewer nuclei are formed. Accordingly, a reduction in the number of nuclei is evidenced by an increase in the ultimate individual particle size accompanied by a slower rate of precipitation. By way of explanation, it is believed that the surfaces of the partially plasticized (i.e. swollen) suspended organic fibers contain many nucleation centers which are available to induce the formation of a precipitate from the incoming polymer containing solution of step I. Consequently, the nucleation energy of activation is lowest at the swollen partially plasticized fiber surface and under certain conditions, i.e. slow rate of addition, the precipitation and growth of the polymeric particles will preferably take place primarily at the organic fiber surface rather than randomly throughout the nonsolvent liquid.

Thus, if the rate of addition and precipitation is too rapid, a major portion of the powder will precipitate before it has the opportunity to reach the fiber surface. One indication that the rate of addition has been too rapid is that instead of observing the fiber-resin agglomerate settle at the bottom of the container upon cessation of stirring, thereby leaving a clear light colored supernatant liquid, which is characteristic of "slow addition" as herein defined, one observes that the suspension is and remains dark red in color and sufficiently cloudy that no fiber is discernible. Consequently any suitable "slow" rate of addition may be readily assessed by one skilled in the art based on these simple observations. Thus, for example, a suitable rate of addition may constitute from about 400 to about 600 cc of said solution emptied in increments of about 100 cc each into the suspension of organic fibers over a period of about 5 minutes.

Alternatively, under production conditions the addition of solution I to the suspended fibers of step II may be continuous provided a "slow" rate of addition is utilized and precipitation occurs at the fiber surface.

It is to be observed that the addition of the suspended organic fibers of step II to the solution of step I will not achieve the desired results and should be avoided.

As described above, step III results in a partial precipitation of the polymer of step I onto the surface of the organic fibers of step II. By way of explanation, such partial precipitation is believed to result from the use of a fairly concentrated solution (e.g. 60 to 75% $H_2SO_4$) to plasticize the organic fibers of step II. Thus, the addition of the highly concentrated (e.g. 100% $H_2SO_4$) solution of step I to the plasticized suspension of step II (having an $H_2SO_4$ concentration of about 60 to 75%) will achieve a substantial increase in the solvating properties (e.g. acidity) of the suspension of step II. The resulting mixture will therefore be a solution having a lower solvent concentration than the initial solution of step I but high enough to retain a portion of the dissolved polymer, especially a non-BBB type polymer, in solution. The amount of polymer remaining unprecipitated will also depend on the composition and the inherent viscosity of the polymer.

In contrast, if a more dilute solution of the organic fiber suspension is utilized (e.g. less than 60%) the amount of polymer retained in suspension may be negligible. At this low level of concentration, however, the organic fibers would not be sufficiently plasticized to achieve the results of the present invention.

The essence of the present invention therefore lies in (1) the use of a "partially plasticized" fiber to provide nucleation and precipitation of the incoming polymer at the fiber surface and (2) precipitation of the polymer of solution I onto the surface of the partially plasticized fiber in two stages and the advantages which flow therefrom.

In view of the above, the partial precipitation of step III will achieve a deposit of a major portion of the dissolved substance of step I onto the surface of the organic fibers which major portion will constitute from about 60 to about 95% typically from about 60 to 85% and most preferably from about 60 to about 75% by weight of the substance originally present in the solution of step I.

The mixture of organic fibers and partial precipitate in the not yet fully precipitated solution is then quickly combined with a non-solvent such as water under high shear conditions such as by pouring the entire mixture into a Waring blender (c.a. 1000 to 3000 rpm) containing water thereby precipitating the remaining polymer from solution and forming a two phase fiber matrix and powder matrix aggregate composition which after filtration possesses a mat-like configuration.

Other suitable non-solvents include acetone, methylethyl ketone, methanol, isopropanol, ethylene glycol, benzene toluene, and trichloroethylene.

The two-step precipitation of the present invention has a twofold advantage, namely, it maximizes recovery of the polymer precipitate from the solution and it promotes uniformity of the resulting fiber-particle aggregate composition. The particles which precipitate from the second precipitation stage have a lower average molecular weight (i.e. than those of the first precipitation stage) and therefore a smaller particle size. The smaller the particles the more easily they are intermingled with the fibrous agglomerated web when exposed to conditions of high shear. Thus, those particles that may be left in suspension after the first precipitation stage will be incorporated into the fiber-particle aggregate in addition to the newly precipitated particles in the second stage.

The second precipitation stage (i.e. step IV) which is accomplished under a high shear agitation improves the uniformity of the composition by eliminating localized fiber-fiber clumping. In addition, washout of the solvent from the fiber-particle aggregate is facilitated.

The composition thus formed is filtered and washed, preferably in hot deionized water to eliminate the $H_2SO_4$ still present from previous steps and preferably while maintaining the composition submerged in the washing medium. The washing and filtering is continued for a time sufficient to obtain a filtrate having a pH of about 4 to about 5. When the filtered residue has reached the desired thickness or density it is allowed to dry to yield a pre-preg mat which is flexible and easily manipulated even when dried comprising particles of powdered polymer affixed to the organic fibers.

If a thicker composition is required, several wet fiber-particle aggregate sheets may be stacked up and cold pressed into a coherent multilayer sheet.

It is appropriate to mention that immediately after the precipitation stage the organic fibers and the adherent particles are in the so-called "activated" state which is characterized by a surface having an enhanced reactivity toward certain polar gaseous or liquid substances, such for example, as air. Thus, if the composition being filtered is exposed to air it can interact with the oxygen in the air and become inactive. Such inactivity is manifested by a decrease in the adhesive properties of two adjacent sheets of the composition being pressed together to provide a stack of laminates. This undesirable effect may be overcome by stacking the fiber-particle aggregate sheets while wet and preferably while still submerged in the washing medium.

As a result of the above described process, a substantial portion of the precipitated particles are strongly adhered to the organic fibers thereby forming something which may be described as a "prebonded" state which, after drying, yields a fiber-particle aggregate having a mat-like configuration which is much stronger than could otherwise be obtained by a conventional precipitation of a polymer onto an unplasticized fiber assembly.

The final fiber-particle aggregate composition comprises from about 95 to about 50%, preferably from about 90 to about 60% and most preferably from 90 to about 70% by weight of the total composition of the polymer originally utilized in the solution of step I and correspondingly from about 5 to about 50%, preferably from about 10 to about 40%, and most preferably from 10 to about 30% by weight of the organic fiber.

The fiber-particle aggregate composition described herein prior to further processing as described above is a randomly oriented polymeric web which may be utilized as is or stacked to provide the desired thickness for the final article. In the latter case the stacked webs may be consolidated by a platen press to yield a "preform" laminate having sufficient adhesive strength between the individual layers (plies) to permit handling as a unit prior to molding. Alternatively, the plies of the laminate may be consolidated, e.g. cold pressed, in the same dies utilized to fabricate the final composite article. A good quality steel alloy matched dye mold may be used to withstand the action of potentially corrosive off-gases and the high pressure at elevated temperature. After cold pressing the sample chamber may be closed vacuum tight, pressure applied, and the mold heated up to the ultimate molding temperature to eliminate the last traces of non-solvent present in the mat.

The substantially uniform fiber-particle aggregate composition may be formed into a three-dimensional shaped article at a temperature which is below the decomposition temperature of the intractable high temperature resistant polymer, and near the glass transition temperature of the cross-linkable additive polymer and organic fibrous support. Preferably the shaped article may be formed at a temperature which is within 50° C of the glass transition temperature of the cross-linkable additive polymer and organic fiber whichever is less, and most preferably at a temperature which is below the lower glass transition temperatures of the cross-linkable additive polymer or organic fiber. Pressure molding techniques are preferably employed to obtain a shaped three dimensional structure. For instance, when the intractable high temperature resistant polymer is a BBB type polymer in a quantity of about 60 to 95 parts by weight, the cross-linkable additive polymer is a polybenzimidazole in a quantity of about 5 to 40 parts by weight and the organic fiber comprises about 10% of the total composition, a molding temperature of about 350° to 420° C and a mold pressure of about 2,000 psi to 50,000 psi may be employed. With the higher molding temperatures the pressure or hold time may be decreased accordingly without affecting the final properties of the shaped article. A representative apparatus for the formation of such shaped articles is a high temperature, controlled ambient hot press, such as manufactured by Astro Industries, Santa Barbara, Calif., or Autoclave Engineers, Erie, Pa.

The resulting shaped article may be heated until the cross-linkable additive polymer component of the admixture is cross-linked and the thermal stability of the shaped article enhanced in a manner as described in U.S. Pat. No. 3,987,015, which is herein incorporated by reference.

The process of the present invention provides a composition which may be utilized in the molding of three-dimensional shaped articles from intractable high temperature resistant polymers to produce a fully fused, coherent product having properties which cannot be obtained when using the intractable polymer alone or in combination with a cross-linkable polymer in the absence of a fibrous support strongly bound to the polymer powder. Not only may good compaction be accomplished within a shaped article, but enhanced polymer bonding to the fibrous support is achieved without any substantial loss of thermal stability. The physical properties such as the tensile, compressive, and shear strengths and moduli, specimen density, high temperature creep and corrosion resistances of the resulting shaped article are improved. For instance, high temperature resistant pressure molded three-dimensional shaped articles having a flexural strength of at least 5,000 psi and, preferably at least 7,000 psi may be formed. The flexural strength values will generally remain unchanged even upon exposure of the composite article to temperatures of 200° C or greater.

The shaped articles formed in accordance with the present invention are capable of utilization in high temperature environments (e.g. 300° C and above) and may be provided in a variety of simple or complex shapes. For instance, structural components, such as shells, domes, membranes (structural or otherwise), cellular structures, plates, and shaped beams, may be formed by use of a suitably large molding press or autoclave. The shaped articles are capable of long-term service in an environment in which a lightweight structure is required to withstand stresses at elevated temperatures or in a corrosive environment. Metal alloys which are commonly being used at the present time are often sensitive to corrosion by hot wet gases (e.g., ammonia or hydrogen) or hot chemical liquids (e.g., acids, alkalies, or solvents) whereas the shaped articles of the present invention are highly resistant to simultaneous corrosion and heat under many service conditions.

The unmolded web (e.g. as filtered and dried) which is substantially stronger than similar high temperature non-woven fiber assemblies prepared by conventional techniques may be advantageously utilized in applications requiring greater strength, improved corrosion resistance or prolonged service life. Preferred applications for the final non-molded mat (or paper) include their use in highly corrosion resistant sheet membranes utilized in high-temperature fuel cells, alkali-chlorine manufacturing cells, and filter bags subjected to hot and corrosive conditions.

The following examples are given as specific illustrations of the invention. It should be understood, however, that the invention is not limited to the specific details set forth in the examples.

EXAMPLE I

The intractable high temperature polymer utilized in Example I is poly(bisbenzimidazobenzophenanthroline) having an inherent viscosity of 2.4 dl./gram and a glass transition temperature above its decomposition temperature of about 650° C formed by the condensation of 1,4,5,8-naphthalene tetracarboxylic acid and 3,3'-diamino benzidine to form a semi-ladder polymer one isomer of which is illustrated in the following equation:

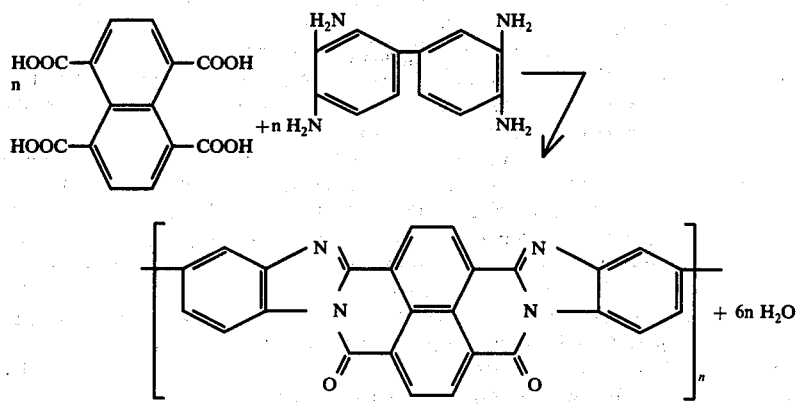

The specific isomer illustrated may be identified as poly[6,9-dihydro-6,9-dioxobisbenzimidazo(2,1-b:1',2'-j)benzo (1mn) (3,8) phenanthroline-2,13-diyl]. It will be apparent to those skilled in the art that various additional isomers will also be produced during the condensation reaction.

The cross-linkable polymer utilized to prepare the composition of Example I comprises preformed poly 2,2', (m-phenylene)5,5'-bi-benzimidazole polymer (PBI) which exhibits an initial glass transition temperature of about 370° C and an inherent viscosity of 0.72 dl./gram.

The organic fiber which is utilized to prepare the composition of Example I is prepared from the above described PBI polymer in any manner known in the art such as, by solution spinning, that is, by dry or wet spinning a solution of the polymer in an appropriate solvent such as N,N-dimethylacetamide, N,N-dimethylformamide, dimethylsulfoxide or sulfuric acid (used only in wet spinning) through an opening of predetermined shape into an evaporative atmosphere for the solvent in which most of the solvent is evaporated (dry) or into a coagulation bath (wet), resulting in the polymer having the desired filamentary shape.

The continuous fibers having an average diameter of about 16 μm are then chopped to length of about ⅛ inch.

8.0 grams of the poly(bisbenzimidazobenzophenanthroline) polymer, and 2.0 grams of the polybenzimidazole polymer as described above are dissolved in 500 grams (275 ml) of 97% $H_2SO_4$ by shaking the solution at room temperature over a period of about 2 days.

A suspension of plasticized polybenzimidazole fibers is prepared by adding 1.0 grams of the polybenzimidazole fiber as described above to 600 grams (400 ml) of a 60:40 $H_2SO_4$:$H_2O$ solution under conditions of slow agitation for a period of about 10 minutes.

An aliquot of 100 grams (55 ml) of the poly(bisbenzimidazobenzophenathroline)-polybenzimidazole polymer solution is then slowly and uniformly added to the polybenzimidazole fiber suspension over a period of about 5 minutes in increments of about 20 grams (11 ml) while continuously stirring the suspension by a mechanical stirrer or manual stirring rod. A precipitate begins to form at the surface of the fibers ans continues until all the respective aliquots have been formed into one column and the addition is complete. Upon analysis it is found that 0.6 grams (6%) of the polymer remains in solution which corresponds to a precipitate of about 94%.

A 70 ml aliquot of the resulting mixture is then added to a high speed blender containing 400 ml of deionized water maintained at a temperature of about 25° C. The high speed blender is operated at a speed of about 1500 rpm and provides high agitation as the remaining polymer precipitates and is entangled into the polybenzimidazole fiber-particle aggregate to form the final fiber-particle aggregate composition. The agitation also facilitates washout of the $H_2SO_4$ solvent from the plasticized fiber and freshly precipitated polymer particles.

The above procedure is repeated three times to obtain a sufficient amount of the composition necessary to form the desired three dimensional shaped structure.

The resulting, separately prepared compositions are combined, filtered, and washed together with hot (e.g. 35° C) deionized water for a period of about 20 minutes, which time is sufficient to obtain a filtrate having a pH of 4.5. Care should be taken to assure that the fiber-polymer precipitate remains covered with the water during the washing and filtration. The pre-preg mat which results is found to comprise 1.6 parts poly(bisbenzimidazobenzophenanthroline), 0.2 parts polybenzimidazole polymer and 0.5 parts polybenzimidazole fiber by weight of the total composition.

EXAMPLE II

Example I is repeated except that poly(bisbenzimidazobenzophenanthroline) fibers prepared from the poly(bisbenzimidazobenzophenanthroline) polymer described in Example I are utilized in place of the polybenzimidazole fibers. Since the poly(bisbenzimidazobenzophenanthroline) derived fibers are more difficult to plasticize the fibers are suspended in a 70:30 solution of $H_2SO_4$ and water and the time in suspension in increased to 15 minutes.

Upon analysis it is found that about 75% of the polymer precipitates in the first precipitation stage.

The resulting mat like composition comprises 1.6 parts poly(bisbenzimidazobenzophenanthroline)-polymer, 0.4 parts polybenzimidazole polymer, and 0.2 parts of the poly(bisbenzimidazobenzophenanthroline) fiber by weight of the total composition.

EXAMPLE III

Example II is repeated except that the cross-linkable polymer is omitted and poly(bisbenzimidazobenzophenanthroline) is utilized to provide the solution from which the composition is obtained.

Upon analysis about 95% of the polymer is found to precipitate in the first precipitation stage.

The resulting mat like composition comprises 2.0 parts poly(bisbenzimidazobenzophenanthroline) and 0.2 parts polybenzimidazole fibers by weight of the total composition.

EXAMPLE IV

Two samples each of the pre-preg mat-like compositions prepared in accordance with Examples I and II are hot pressed at 400° C. More specifically, the dry compositions of Examples I and II are separately placed in a cylindrical piston type steel die having an inner opening of 1.25 inches in diameter. The sample chamber is closed vacuum tight and evacuated to rough vacuum of about 10 μm/Hg during the hot molding cycle. A ram pressure of 20,000 psi is applied and the sample progressively is heated to 400° C at a rate of about 10° C/minute and the shaped article is formed. After reaching 400° C, that temperature is held for 30 minutes to assure full cross-linking of the poly 2,2'(m-phenylene)5,5'-bibenzimidazole (cross-linkable) polymer. Thereafter, the heater is shut off and the mold cooled by a nitrogen gas purge to about 125° C at which time the pressure is removed, the mold removed, and the specimen ejected from the warm die. The cooling time is about 30 minutes.

The flexual strength of the resulting molded articles is determined by the following method: Two small test bars, about 1 inch long, 0.25 inches wide and 0.06 inches thick, are cut from the central part of the molded discs by means of a fine circular diamond saw and are tested for three point flexure and bulk density. Except for the smaller dimensions of the test bar, the flexural strength is determine in accordance with ASTM D790. The bulk density is calculated from the measured weights and dimensions of the bars.

The results of these tests are set forth in Table I.

Table I

| Test | Sample | Test Samples from Composition of: | | | |
|---|---|---|---|---|---|
| | | Example I | | Example II | |
| | | A | B | A | B |
| Mean Flexural Strength(psi) | | 9700 | 8900 | 5000 | 9900 |
| Mean Flexural Modulus ($10^5$ psi) | | 6.4 | 6.3 | 5.6 | 6.2 |
| Bulk Density(g/cm$^3$) | | 1.32 | 1.30 | 1.25 | 1.31 |

Although the invention has been described with preferred embodiments, it is to be understood that variation and modifications may be resorted to as will be apparent to those skilled in the art. Such variations and modifications are to be considered within the purview and scope of the claims appended hereto.

What is claimed is:

1. A process for providing a high temperature resistant composition from a normally intractable high temperature resistant polymer, which composition is capable of forming a three dimensional shaped article which comprises:
   I. providing a solution of a substance selected from the group consisting of:
      (a) a nitrogenous intractable high temperature resistant polymer which does not have a glass transition temperature below its decomposition temperature, or precursors capable of forming the same; and
      (b) an admixture comprising from about 60 to about 95 parts by weight of the intractable polymer of (a) and from about 5 to about 40 parts by weight of at least one cross-linkable polymer exhibiting a glass transition temperature above 200° C and below its decomposition temperature, or precursors capable of forming the same;
   II. providing a suspension of partially plasticized organic fibers derived from polymers selected from the group consisting of:
      (a) the intractable polymer of step I(a),
      (b) polybenzimidazoles,
      (c) high temperature resistant aromatic polyamides,
      (d) high temperature resistant aromatic polyesters, and mixtures thereof;

III. combining the suspension of II and the solution of I in a manner sufficient to provide a precipitation of a major portion of the dissolved substance of I affixed to the suspended organic fibers of II thereby forming a mixture containing a fiber-particle aggregate;

IV. combining the mixture of III with a non-solvent in a manner sufficient, and with properties sufficient to precipitate, affix, and incorporate the remaining portion of the dissolved substance of I from the mixture of III into the fiber-particle aggregate to form a fiber-particle aggregate composition comprising from about 95 to about 50%, by composition weight, of the substance present in the solution of I affixed to and intimately admixed with from about 5 to about 50%, by composition weight, of said organic fibers of II; and V. filtering and washing the composition to remove residual solvent.

2. The process of claim 1 wherein the suspension of partially plasticized organic fibers is provided by then contacting the organic fibers with a mixture of sulfuric acid and water having a ratio by volume of about 60:40 to about 75:25 for a period of about 5 to about 20 minutes.

3. The process of claim 1 wherein the organic fibers of II have an average length of about 0.25 to about 2.0 inches.

4. The process of claim 1 wherein the cross-linkable polymer is selected from the group consisting of polybenzimidazoles, polybenzoxazoles, polyoxadiazoles, polyquinoxalines, polybenzothiazoles, and mixtures thereof.

5. The process of claim 1 wherein the aromatic polyamide of II(c) is poly(m-phenyleneisophthalamide).

6. The process of claim 1 wherein about 60 to about 95% of the totally dissolved substance of the solution of I is precipitated onto the surface of the suspended organic fibers of step II.

7. The process of claim 1 wherein the solution of step I is added to the solution of step II at a slow rate of addition.

8. The process of claim 1 wherein the fiber-particle aggregate composition of step IV comprises from about 10 to about 40% of organic fibers and from about 90 to about 60% of the substance utilized in step I.

9. The process of claim 1 wherein the nitrogenous intractable high temperature resistant polymer of step I which lacks a glass transition temperature below its decomposition temperature is a condensation product of at least one organic tetra-amine with at least one tetra-carboxylic acid or corresponding anhydride.

10. A process for providing a composition from a normally intractable high temperature resistant polymer, which composition is capable of being molded into a shaped article which comprises:

I. providing a solution of a substance selected from the group consisting of:
 (a) an intractable high temperature resistant polymer which is the condensation product of at least one organic tetraamine with at least one tetracarboxylic acid or corresponding anhydride and which does not have a glass transition temperature below its decomposition temperature;
 (b) an admixture comprising from about 60 to about 95 parts by weight of the intractable polymer of (a) and from about 5 to about 40 parts by weight of at least one cross-linkable polymer exhibiting a glass transition temperature above 200° C and below its decomposition temperature, or precursors capable of forming the same;

II. providing a suspension of partially plasticized organic fibers having an average length of from about 0.25 to about 2.0 inches which fibers are derived from polymers selected from the group consisting of:
 (a) the intractable polymer of step I(a),
 (b) polybenzimidazoles,
 (c) high temperature resistant aromatic polyamides,
 (d) high temperature resistant aromatic polyesters, and mixtures thereof;

III. adding the solution of I to the suspension of II at a slow rate of addition to affix a precipitate of about 60% to about 95% of the total amount of the dissolved substance of I onto the suspended organic fibers of step II thereby forming a mixture containing a fiber-particle aggregate;

IV. combining the mixture of III with a non-solvent medium, under high shear conditions, to precipitate affix and incorporate the remaining portion of the dissolved substance of step I from the mixture of III into the fiber particle aggregate to form a fiber-particle aggregate composition comprising from about 95 to about 50% by weight of the total composition of the substance present in the solution of I affixed to and intimately admixed with from about 5 to about 50%, by composition weight, of said organic fibers of II; and V. filtering and washing the composition while submerged under water to remove residual solvent.

11. The process of claim 10 wherein the aromatic polyamide of step II(c) is poly(m-phenyleneisophthalamide).

12. The process of claim 10 wherein said cross-linkable polymer is selected from the group consisting of polybenzimidazoles, polybenzoxazoles, polyoxadiazoles, polyquinoxalines, polybenzothiazoles and mixtures thereof.

13. The process of claim 10 wherein the suspension of partially plasticized organic fibers is provided by suspending them in a plasticizing agent for a period of not less than 5 minutes.

14. The process of claim 10 wherein the suspension of partially plasticized organic fibers is provided by suspending them in a mixture of sulfuric acid and water having a ratio by volume of about 60:40 to about 75:25 respectively for a period of about 10 to about 15 minutes.

15. The process of claim 10 wherein the admixture of step I(b) comprises about 80 to about 90 parts by weight of said intractable polymer of step I(a) and about 10 to 20 parts of polybenzimidazole.

16. The process of claim 10 wherein the poybenzimidazole is poly 2,2'-(m-phenylene)5,5'-bibenzimidazole.

17. The process of claim 9 wherein the solution of step I is added to the suspension of step II under conditions of low agitation.

18. The process of claim 10 wherein the non-solvent medium of step IV is a $C_1$ to $C_3$ alcohol.

19. The process of claim 10 wherein the solution of step I is provided by dissolving said substance in a solvent selected from the group consisting of sulfuric acid, methane sulfonic acid, polyphosphoric acid, chlorosulfonic acid, trifluoromethane sulfonic acid, benzenesulfonic acid and mixtures thereof.

20. A reinforced high temperature resistant composition capable of forming a three-dimensional shaped article having a mean flexural strength of at least 5000 psi at room temperature which composition is prepared by a process which comprises:
I. providing a solution of a substance selected from the group consisting of:
  (a) a nitrogenous intractable high temperature resistant polymer which does not have a glass transition temperature below its decomposition temperature, or precursors capable of forming the same; and
  (b) an admixture comprising from about 60 to about 95 parts by weight of the intractable polymer of (a) and from about 5 to about 40 parts by weight of at least one cross-linkable polymer exhibiting a glass transition temperature above 200° C and below its decomposition temperature, or precursors capable of forming the same;
II. providing a suspension of partially plasticized organic fibers derived from polymers selected from the group consisting of
  (a) the intractable polymer of step I(a),
  (b) polybenzimidazoles,
  (c) high temperature resistant aromatic polyamides,
  (d) high temperature resistant aromatic polyesters, and mixtures thereof;
III. combining the suspension of II and the solution of I in a manner sufficient to provide a precipitation of a major portion of the dissolved substance of I affixed to the suspended organic fibers of II thereby forming a mixture containing a fiber-particle aggregate;
IV. combining said mixture with a non-solvent medium under high shear conditions to precipitate affix and incorporate the remainder of the dissolved substance of I from said mixture into said partially plasticized organic fibers having the partial precipitate affixed thereto to form a fiber-particle aggregate composition comprising from about 95 to about 50%, by composition weight, of the substance of solution I and from about 5 to about 50% by composition, weight of the organic fibers of II and filtering and washing the composition to remove residual solvent.

21. A high temperature resistant three dimensional shaped article having a flexural strength of at least 5000 psi comprising the high temperature resistant composition of claim 20 which has been molded under elevated temperature and pressure.

22. The composition of claim 20 wherein said cross-linkable polymer is selected from the group consisting of polybenzimidazoles, polybenzoxazoles, polyoxadiazoles, polyquinoxalines, polybenzothiazoles and mixtures thereof.

23. The composition of claim 20 wherein the admixture of I(b) comprises about 80 to about 90 parts by weight of said intractable polymer of step I(a) and about 10 to 20 parts of polybenzimidazole.

24. The composition of claim 20 wherein the polybenzimidazole is poly 2,2'-(m-phenylene)5,5'-bibenzimidazole.

25. The composition of claim 20 wherein the fiber-particle aggregate composition is filtered and washed while submerged under water.

26. The composition of claim 20 wherein the suspension of partially plasticized organic fibers is provided by contacting said organic fibers with a mixture of sulfuric acid and water at a ratio of about 60:40 to 75:25 for a period of about 10 to about 15 minutes.

27. The composition of claim 20 wherein the organic fibers are suspended in a 60:40 mixture of $H_2SO_4$ and water respectively.

28. The composition of claim 20 wherein said solution is added to said suspension under conditions of low agitation.

29. The composition of claim 20 wherein the non-solvent medium of step IV is a $C_1$ to $C_3$ alcohol.

30. The composition of claim 20 wherein the aromatic polyamide of II(c) is poly(m-phenyleneisophthalamide).

* * * * *